UNITED STATES PATENT OFFICE.

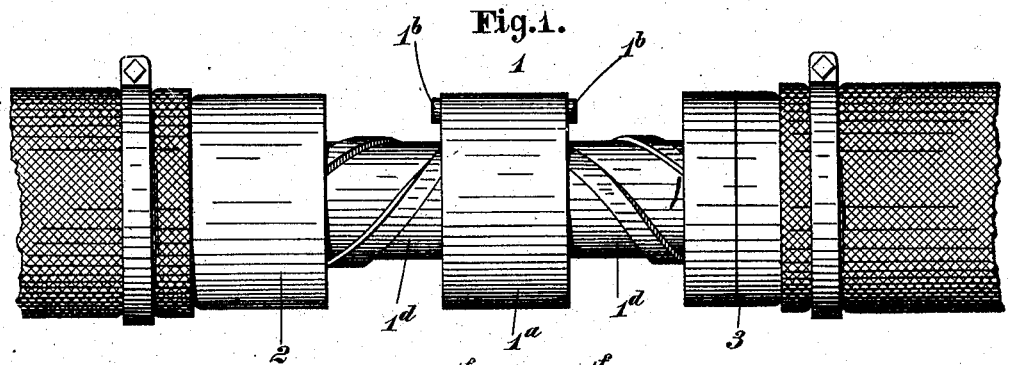
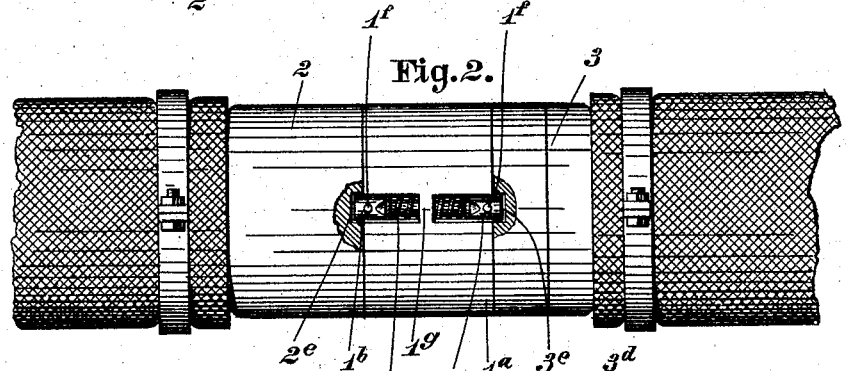
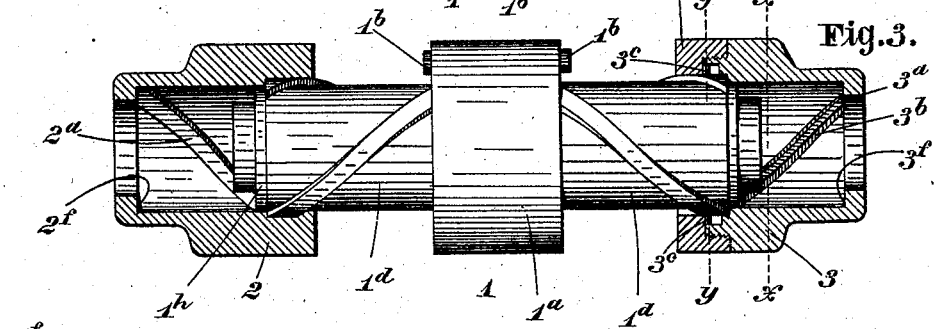
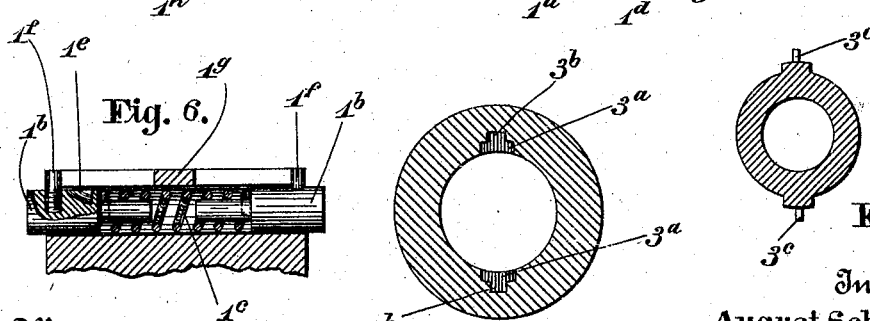

AUGUST SCHAFFER, OF COLUMBUS, OHIO.

HOSE-COUPLING.

No. 815,476.　　　　Specification of Letters Patent.　　　Patented March 20, 1906.

Application filed June 28, 1905. Serial No. 267,380.

*To all whom it may concern:*

Be it known that I, AUGUST SCHAFFER, a citizen of the United States, residing at Columbus, in the county of Franklin and State of Ohio, have invented certain new and useful Improvements in Hose-Couplings; and I do hereby declare the following to be a full, clear, and exact description of the invention, such as will enable others skilled in the art to which it appertains to make and use the same.

The object of the invention is to provide an improved hose-coupling which can be operated to couple the ends of a hose or the end of a hose and a nozzle by simply drawing the parts in direct line toward each other and which can be uncoupled by first operating a latch and separating the parts in a similar line.

The invention consists in the construction hereinafter described and claimed, the claims not being confined to the precise forms and proportions of parts shown.

In the accompanying drawings, Figure 1 is a plan view showing the parts partially separated. Fig. 2 is a similar view (but partly in section to show details of the latching device) showing the parts closed or coupled. Fig. 3 is a view, partly in section and partly in full view, showing the interior construction of the female members or collar. Fig. 4 is a cross-section on plane $x$ $x$, Fig. 3, to show chiefly the shape in cross-section of the peculiar thread-groove in the right-hand member of that view. Fig. 5 is a cross-section of the right-hand portion of the male member on the plane $y$ $y$ looking to the left. Fig. 6 is a detail sectional view of the devices for latching the parts together after they are coupled.

From a general inspection of the drawings it will be observed that the coupling device as a whole involves three principal members— viz., the two non-rotative female members or collars, which are on the ends of the parts to be coupled, and a central rotary male member.

In the views, 1 designates as a whole the rotary male member. This member comprises a central or hub portion $1^a$, bearing the latching device, and two male portions to enter the collars. The latch comprises two bolts $1^b$, seated in a suitable cavity in the central hub, and an interposed spring $1^c$, tending to project the bolts beyond the lateral faces of the hub. The male members are designated $1^d$. They extend axially from the opposite sides of the central portion $1^a$ and are each provided with threads of a steep or rapid pitch—for example, a pitch of forty-five degrees. The threads on one side are of the right-hand kind, while those on the other are of the left-hand kind.

The female members are designated 2 and 3, respectively, and each is provided with appropriate thread-grooves $2^a$ and $3^a$, respectively, to receive the threads on the male members. In order to lock the central rotative male member to one part of the hose or to a nozzle and thereby prevent its loss, I provide means whereby said member is connected with one of the female members (as that designated 3) consisting of pins $3^c$, projecting from the tops of the threads, said pins being accommodated in the operation of the device by a deepened portion $3^b$ in the groove $3^a$. To permit the addition and use of these pins $3^c$ to the threads, the female member 3 is furnished with a ring $3^d$, which, preparatory to adding the pins $3^c$, is first placed on the male member and then screwed into the main body of the female member. This ring fits close to the top of the threads, and therefore affords a stop to confine the female member 3 as a whole to the male member. The point of uncoupling, therefore, would take place between the female member 2 and the central portion or hub of the male member.

The inner edges of the female member are provided with holes $2^e$ and $3^e$ to receive the locking-pins.

The end of each of the male members is reduced to form a shoulder, and on the reduced end is carried a packing-ring or washer $1^h$, adapted to seat on a seat $2^f$ or $3^f$, as the case may be, when the parts are closed.

The operation is very simple. Assuming that the separated parts are first brought to the position indicated in Figs. 1 and 3, it is only necessary to draw the female parts 2 and 3 in a direct line toward each other against the central hub portion, when the spring-actuated bolts enter and engage the holes $2^e$ and $3^e$ in the inner edge of the female members, which engagement automatically takes place.

To uncouple the parts, it is only needed to withdraw with the fingers the bolts $1^b$, notches $1^e$ being provided to permit the use of the fingers for this purpose. Lateral pins $1^f$, screwed into the bolts, will by their contact with the bridge-piece 1ᵍ prevent the loss of the latching device when the parts are uncoupled.

What I claim, and desire to secure by Letters Patent, is—

1. In a hose-coupling, the combination with the parts to be coupled, of collars or female members fixed to said parts and threaded with a steep pitch, a rotative male member correspondingly threaded and engaging said female members adapted to be rotated by drawing the collars or female members in a direct line toward each other and means for locking the parts when closed.

2. In a hose-coupling, the combination with parts to be coupled, of collars or female members fixed to said parts and threaded with a steep pitch and having seats for packing, a rotative male member correspondingly threaded and engaging said female members adapted to be rotated by drawing the collars or female members in a direct line toward each other, packing between the male and female members, and means for locking the parts when closed.

3. In a hose-coupling, the combination with the parts to be coupled, of collars or female members fixed to said parts and threaded with a steep pitch and having seats for packing, a rotative male member correspondingly threaded and engaging said female members adapted to be rotated by drawing the collars or female members in a direct line toward each other, a packing carried by the male member to close upon the seat therefor in the female member and means for locking the parts when closed.

4. In a hose-coupling, the combination with parts to be coupled, of collars or female members threaded with a steep pitch, a rotative male member correspondingly threaded and engaging said female members adapted to be rotated by drawing the collars or female members toward each other, and means whereby the male member remains attached to one of the female members after the other female member is detached.

5. In a hose-coupling, the combination with parts to be coupled, of collars or female members threaded with a steep pitch, a rotative male member correspondingly threaded and engaging said female members adapted to be rotated by drawing the collars or female members toward each other, and means for attaching the male member to one of the female members so as to prevent its loss, comprising a pin on the male member to run in a thread on the female member and a separable device on the female member to afford a stop for said pin.

6. In a hose-coupling, the combination with parts to be coupled, of collars or female members threaded with a steep pitch, and a rotative male member correspondingly threaded and engaging said female members adapted to be rotated by drawing the collars or female members toward each other and an automatically-operated latching device to latch the female to male member when the parts are closed.

7. In a hose-coupling, the combination with parts to be coupled, of collars or female members threaded with a steep pitch, a rotative male member correspondingly threaded and having a central shoulder or projection, and a locking device for the parts seated in said shoulder or projection comprising a spring-actuated bolt adapted to engage the female member when it is closed on the male member.

8. In a hose-coupling, the combination with parts to be coupled, of collars or female members fixed to said parts and one of which has a thread of steep pitch, a rotative male member connected with said collars and provided with a thread of a pitch corresponding to the pitch of the threaded female member whereby the coupling may be effected by moving the female members in a direct line toward each other upon the male member and means for locking the parts in coupling position.

In testimony whereof I affix my signature in presence of two witnesses.

AUGUST SCHAFFER.

Witnesses:
U. R. PETERS,
BENJ. FINCKEL.